US008660727B2

(12) United States Patent
Katou

(10) Patent No.: US 8,660,727 B2
(45) Date of Patent: Feb. 25, 2014

(54) ELECTRIC DRIVE APPARATUS AND PROCESS

(75) Inventor: Yoshiaki Katou, Fujisawa (JP)

(73) Assignee: JATCO Ltd, Fuji-shi (JP)

( * ) Notice: Subject to any disclaimer, the term of this patent is extended or adjusted under 35 U.S.C. 154(b) by 454 days.

(21) Appl. No.: 12/893,547

(22) Filed: Sep. 29, 2010

(65) Prior Publication Data

US 2011/0077810 A1 Mar. 31, 2011

(30) Foreign Application Priority Data

Sep. 30, 2009 (JP) ................................ 2009-227099

(51) Int. Cl.
*B60L 9/00* (2006.01)
*B60L 11/00* (2006.01)
*G05D 1/00* (2006.01)
*G05D 3/00* (2006.01)
*G06F 7/00* (2006.01)
*G06F 17/00* (2006.01)

(52) U.S. Cl.
USPC ........................................................ 701/22

(58) Field of Classification Search
USPC ........................................................ 701/22
See application file for complete search history.

(56) References Cited

U.S. PATENT DOCUMENTS 4,656,587 A * 4/1987 Osanai et al. .................. 701/60
5,222,572 A 6/1993 Yamagiwa et al.
5,355,749 A 10/1994 Obara et al.
5,413,540 A * 5/1995 Streib et al. .................... 477/43
6,090,007 A 7/2000 Nakajima et al.
6,436,003 B1 * 8/2002 Kleila et al. .................... 477/43
7,463,962 B2 * 12/2008 Brunemann et al. ............ 701/55
2006/0006008 A1 * 1/2006 Brunemann et al. ......... 180/65.2

FOREIGN PATENT DOCUMENTS

JP 05-176419 A 7/1993

OTHER PUBLICATIONS

Search Report received in European Patent Application No. 10 18 1538, dated Sep. 29, 2013.

* cited by examiner

*Primary Examiner* — Khoi Tran
*Assistant Examiner* — Harry Oh
(74) *Attorney, Agent, or Firm* — Foley & Lardner LLP

(57) ABSTRACT

An electric drive apparatus includes a controller for controlling an electric motor and a continuously-variable transmission connected with the motor. The controller controls the motor and the continuously-variable transmission in a first control mode to control the transmission ratio of the continuously-variable transmission to a predetermined fixed ratio so as to hold the transmission ratio at the fixed ratio, and to control the motor to achieve the demand motor torque when a demand motor operation point determined from a predetermined assumed ratio is within a predetermined operation range, and to control the motor and the continuously-variable transmission in a second control mode to vary the transmission ratio and to control the motor to achieve a desired driving torque for a driven member driven by the motor when the demand motor operation point is not within the predetermined operation range.

17 Claims, 10 Drawing Sheets

ELECTRIC DRIVE APPARATUS AND PROCESS

BACKGROUND OF THE INVENTION

The present invention relates to electric drive apparatus and/or electric drive control process.

A Japanese patent document JP05-176419A (U.S. Pat. No. 5,355,749) shows an electric drive apparatus including an electric motor and a continuously-variable transmission. This electric drive apparatus is arranged to achieve a driving state adapted to a driver's intention by controlling the rotational speed of the motor at a desired motor speed obtained from a maximum efficiency curved line of the inverter and motor, and varying the transmission ratio or gear ratio of the continuously-variable transmission.

SUMMARY OF THE INVENTION

However, the electric drive apparatus of the above-mentioned patent document is problematical in the following point because of its configuration to perform the transmission ratio control of the continuously-variable transmission always in order to achieve the optimum efficiency of the motor. The continuously-variable transmission of various types such as the belt type and toroidal type are generally lower in efficiency (about 90%) than a constant-mesh speed reduction mechanism. The efficiency of the continuously-variable transmission is further decreased when the ratio coverage is made greater than or equal to 5 to increase the variation width of the gear ratio between the smallest reduction ratio and the greatest reduction ratio, represented by the ratio coverage. If, on the other hand, the ratio coverage is made smaller to improve the efficiency, then the required size of the motor is increased. In either case, the mountability or the ease of mounting the electric drive apparatus on a vehicle becomes poorer.

It is therefore an object of the present invention to provide electric drive apparatus and/or process suitable to improve the efficiency and compactness.

According to one aspect of the present invention, an electric drive apparatus comprises: an electric motor adapted to drive a driven member; a continuously-variable transmission connected with the motor, to transmit rotation from the motor to the driven member; and a controller to control the motor and the continuously-variable transmission in a first control mode to control the transmission ratio of the continuously-variable transmission to a predetermined fixed ratio so as to hold the transmission ratio at the fixed ratio, and to control the motor to achieve the demand motor torque when the demand motor operation point determined from a predetermined assumed ratio is within a predetermined operation range; and to control the motor and the continuously-variable transmission in a second control mode to vary the transmission ratio of the continuously-variable transmission and to control the motor to achieve the desired driving torque when the demand motor operation point is not within the predetermined operation range.

According to another aspect of the invention, a electric drive control process of controlling an electric motor and a continuously-variable transmission connected with the motor, to transmit rotation from the motor to a driven member to be driven by the motor for achieving a desired driving torque, comprises: a first process element of examining whether a demand motor operation point determined from a predetermined assumed transmission ratio is within a predetermined operation range; a second process element of controlling the motor and the continuously-variable transmission in a first control mode to control the transmission ratio of the continuously-variable transmission to a predetermined fixed ratio value and control the motor so as to achieve the demand motor torque when the demand motor operation point is within the predetermined operation range; and a third process element of controlling the motor and the continuously-variable transmission in a second control mode to vary the transmission ratio of the continuously-variable transmission and control the motor so as to achieve the desired driving torque when the demand motor operation point is not within the predetermined operation range.

DETAILED DESCRIPTION OF THE INVENTION

First Embodiment

Figure 1:
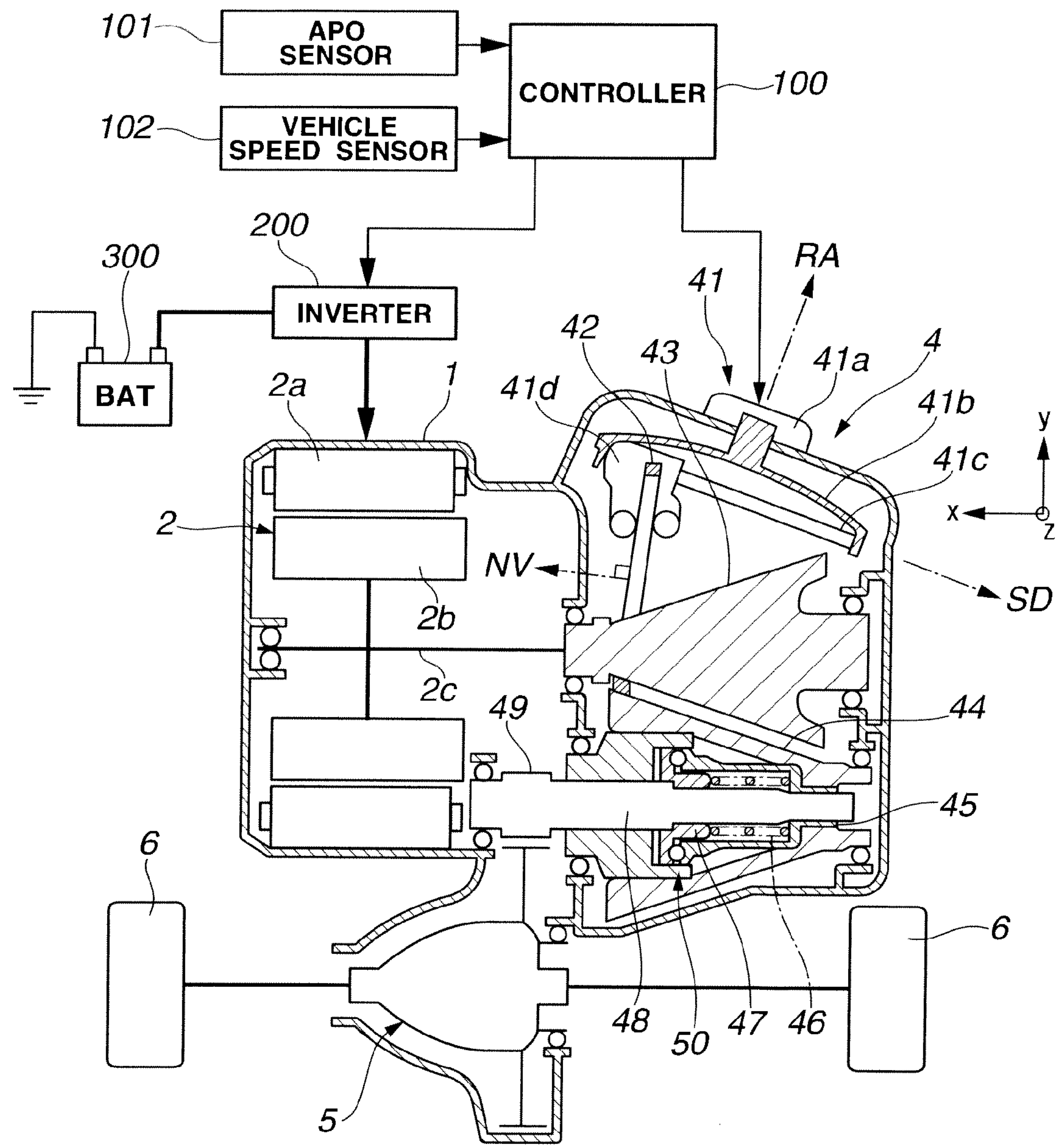
FIG. 1 is a schematic view showing an electric vehicle equipped with an electric drive apparatus or unit of a practical example according to a first embodiment of the present invention.
Figure 2:
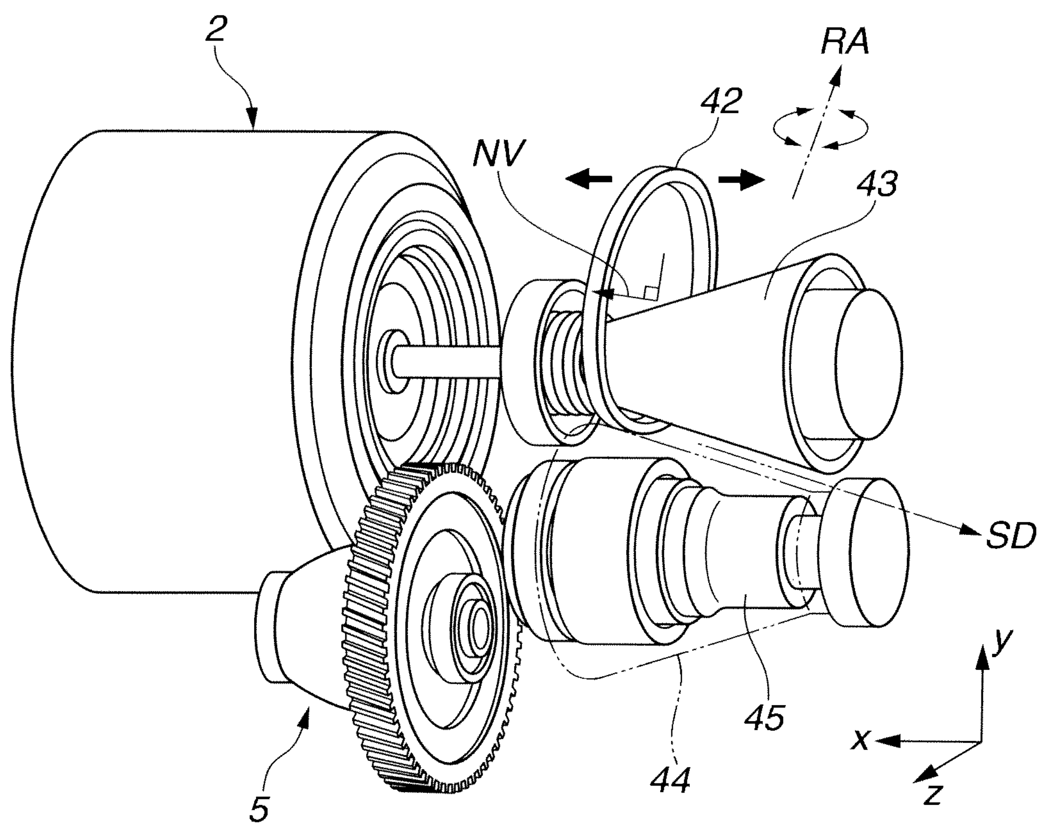
FIG. 2 is a perspective view showing main parts of the electric drive apparatus shown in FIG. 1.

FIG. 1 schematically shows the construction of an electric vehicle equipped with an electric drive apparatus or unit in a practical example according to a first embodiment of the present invention. The electric drive apparatus shown in FIG. 1 includes an electric motor 2, a continuously-variable transmission 4 which, in this example, is a corn-ring type continuously-variable transmission (hereinafter referred to as KRG). Motor 2 and KRG 4 are enclosed in a housing 1. The driving force outputted from an output shaft 48 of KRG 4 is transmitted, through a differential mechanism 5 engaging with an output gear 49, to drive wheels 6 of the vehicle. The electric drive apparatus further includes a controller 10 for controlling the traveling condition, a power source 300 which is in the form of a battery in this example, and an inverter 200 for outputting a motor drive current to the motor 2. For the sake of explanation, an x axis positive direction is defined as a direction shown by an arrow in FIG. 1 extending leftwards as viewed in FIG. 1, a y axis positive direction is a direction extending upwards in FIG. 1, and a z axis positive direction is a direction perpendicular to the sheet of FIG. 1, extending from the back side of the sheet, to the front side. Thus, the x, y and z axes are defined as best shown in FIG. 2, and the z axis is perpendicular to the x axis and y axis.

Controller 100 is connected with an APO sensor 101 (or accelerator input sensor) for sensing a driver's accelerator operation quantity APO and supplying an APO signal to controller 100, and a vehicle speed sensor 102 for sensing a vehicle speed VSP of the vehicle and supplying a vehicle speed signal to controller 100. In accordance with input information including at least these input sensor signals, the controller 100 functions as a motor controlling means for controlling the driving condition of motor 2, as a transmission controlling means for controlling the shift condition of KRG 4, and as a judging means for determining whether or not the motor 2 is able to output required torque and speed within rated range in the state in which the transmission ratio of KRG 4 is fixed at one. Thus, controller 100 serves as a controller of a control system as mentioned more in detail later. Vehicle speed sensor can serve as a sensor for sensing the (actual) speed of a driven member driven by the motor.

Figure 5:
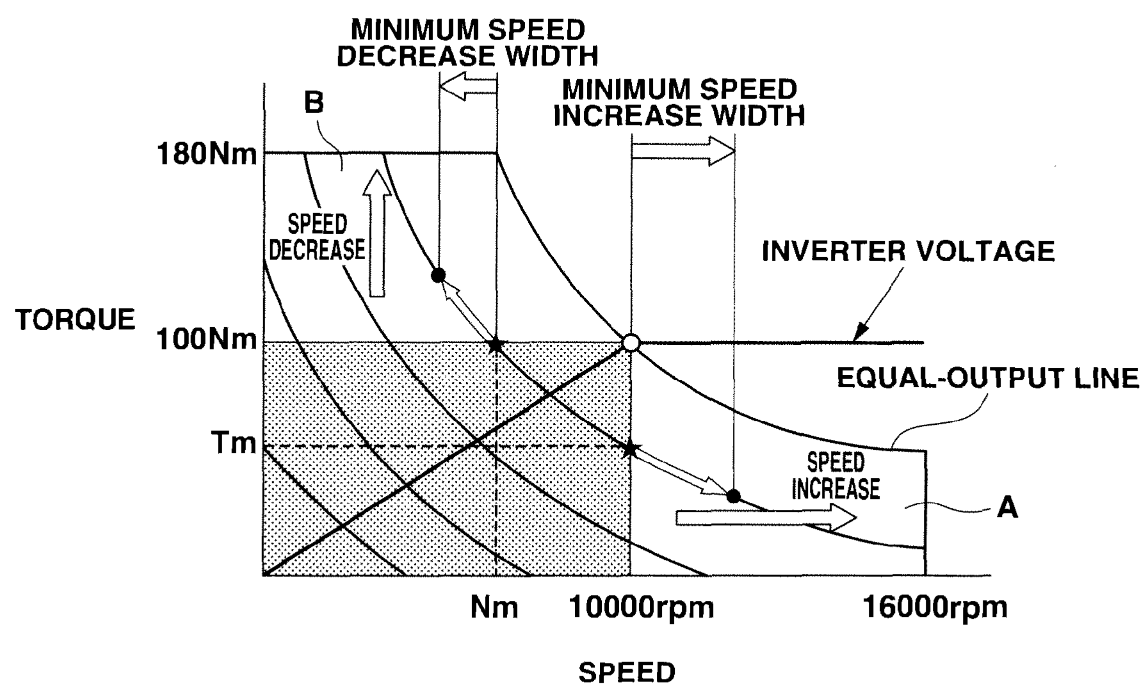
FIG. 5 is a graphic view showing a map representing a relationship of motor speed, motor torque and inverter output voltage, in the practical example according to the first embodiment.

Motor 2 includes a stator 2*a*, a rotor 2*b* and a motor output shaft 2*c* coupled with rotor 2*b*. Stator 2*a* is provided with a coil, and is fixed in the inside circumference of housing 1. A plurality of permanent magnets are embedded in rotor 2*b*. The motor 2 of this example is a constant torque motor capable of achieving a combination of torque and rotational speed freely within a rated range. The rated range is an output limit range in which the motor 2 can be driven continuously in a stable state. FIG. 5 shows a map representing a relationship between the motor (rotational) speed, the motor torque and the inverter output voltage in this example of the first embodiment. In this example, the rated range of motor 2 is a hatched or shadowed region bounded by a rated torque Tmax=100 Nm and a rated speed Nmax=10000 rpm. Motor 2 outputs the rated output when motor 2 is rotated at the rated speed Nmax in the state of the rated torque Tmax. Until this output is reached, the system can control the output condition of motor 2 freely. The greatest output (highest voltage) of inverter 200 is outputted in the state of Tmax and Nmax, and the output of inverter 200 is controlled within the output range equal to or lower than this greatest output. Accordingly, it is possible to use, as the inverter 200, an inverter having a construction corresponding to the output voltage for 100 Nm and 10000 rpm, and the required capacity of the inverter is smaller than the capacity corresponding to the torque and speed required for the output shaft torque.

Continuously-variable transmission 4 in the form of KRG includes an input cone 43 and an output cone 44. The input cone 43 is connected with motor output shaft 2*c* and rotatably supported coaxially with motor output shaft 2*c* on a common axis extending along the x axis. Input cone 43 has a conical outside circumferential surface forming a predetermined inclination angle (referred to as a cone angle (alpha), cf. FIG. 7) with respect to the common axis. The output cone 44 is disposed on an axis which is parallel to the axis of input cone 43 so that the axis of output cone 44 extends along the x axis. Output cone 44 has a conical outside circumferential surface having a cone angle equal to the cone angle of input cone 43. The maximum radius (or the minimum radius) of input cone 43 and the maximum radius (or the minimum radius) of output cone 44 may be equal to each other or may be unequal to each other as long as the cone angle is equal between input and output cones 43 and 44.

A loading mechanism 50 is disposed in the output cone 44. Loading mechanism 50 includes a first cam member or cone side cam member 45, a second cam member or output shaft side cam member 47 and a spring 46. The first cam member 45 is arranged to rotate as a unit with output cone 44, and shaped to have a cam surface at an axial end surface. The second cam member 47 is arranged to rotate as a unit with output shaft 48, and shaped to have a cam surface at an axial end surface. The spring 46 is disposed between first and second cam members 45 and 47, and arranged to provide an initial urging force. Balls are provided between the cam surfaces of first and second cam members 45 and 47, and the cam surfaces are so contoured to produce a loading force or force to expanding the cam mechanism along the x axis in accordance with the amount of a relative rotation between the first and second cam members.

A shift ring 42 (or transfer ring) is disposed between the input cone 43 and output cone 44. The shift ring 42 is annular, and includes an inner annular surface contacting with input cone 43 and an outer annular surface contacting with output cone 44. Shift ring 42 is supported rotatably by a shift actuator 41 along the circumference of the ring. Shift actuator 41 includes one or more support member 41*d* supporting the shift ring 42 slidably at a plurality of positions distributed circumferentially, and defining a normal vector (NV) of shift ring 42. Support member 41*d* is movable along a transfer shaft 41*c* extending in parallel to a cone angle direction (referred to as a shift direction (SD) hereinafter) in a plane containing the center axis of input cone 43 and the center axis of output cone 44. Furthermore, the shift actuator 41 includes a rotating member 41 b and a rotational actuating member 41*a*. The rotating member 41 b is arranged to rotate the transfer shaft 41*c* about a rotation axis (RA) which is perpendicular to both of the shift direction (SD) and the z axis. The rotational actuating member 41*a* is arranged to control the rotational angular position of rotation member 41*b*.

FIG. 2 shows, in perspective, main parts of the electric drive unit of motor 2 and KRG 4 shown in FIG. 1. When the transmission ratio (or speed ratio) is constant, the normal vector (NV) of the shift ring 42 has a z axis component equaling to zero along the z axis, and has predetermined x axis component and y axis component so as to form a direction parallel to the shift direction. When the input cone 43 is rotated, the input cone 43 drives the shift ring 42 by the friction between the surface of input cone 43 and the inner annular surface of shift ring 42. During this, the output cone 44 is driven by the friction between the outer annular surface of shift ring 42 and the surface of output cone 44. The transmission ratio is varied to the Low side as the position of shift ring 42 is moved in the x axis positive direction, and the transmission ratio is varied to the High side as the position of shift ring 42 is moved in the x axis negative direction opposite to the x axis positive direction. KRG 4 of this example is so set that the transmission ratio is equal to one at a middle position at or near the middle, along the x axis, of cones 43 and 44. The middle portion along the x axis is a region in which the torque transmission efficiency of KRG 4 becomes highest.

When the torque of output shaft 48 increases, a pushing force is applied from output shaft 48 to the output cone 44 in a direction pushing the output cone 44 in the x negative direction, and therefore, the shift ring 42 is pressed between output cone 44 and input cone 43. Thus, the loading force among the input cone 43, shift ring 42 and output cone 44 is set in accordance with the torque. Therefore, this friction drive mechanism can provide effective performance with a reduced slippage.

When a shift command is delivered, the actuating element 41 a rotates the rotating member 41 b through a predetermined rotational angle about the rotation axis (RA). Then, there is produced a large speed difference in the contact portions between the shift ring 42 and each of input and output cones 43 and 44, and the thus-produced speed difference causes a force shifting the shift ring 42 in the shift direction (SD). Thus, the shift ring 42 is moved along the x axis so that the x position of shift ring 42 is shifted, and the transmission ratio is varied continuously. At the end of the shift operation, the shift is finished by rotating the rotational actuating element 41 a and thereby making the z axis component of the normal vector of the shift ring 42 equal to zero.

Figure 3:
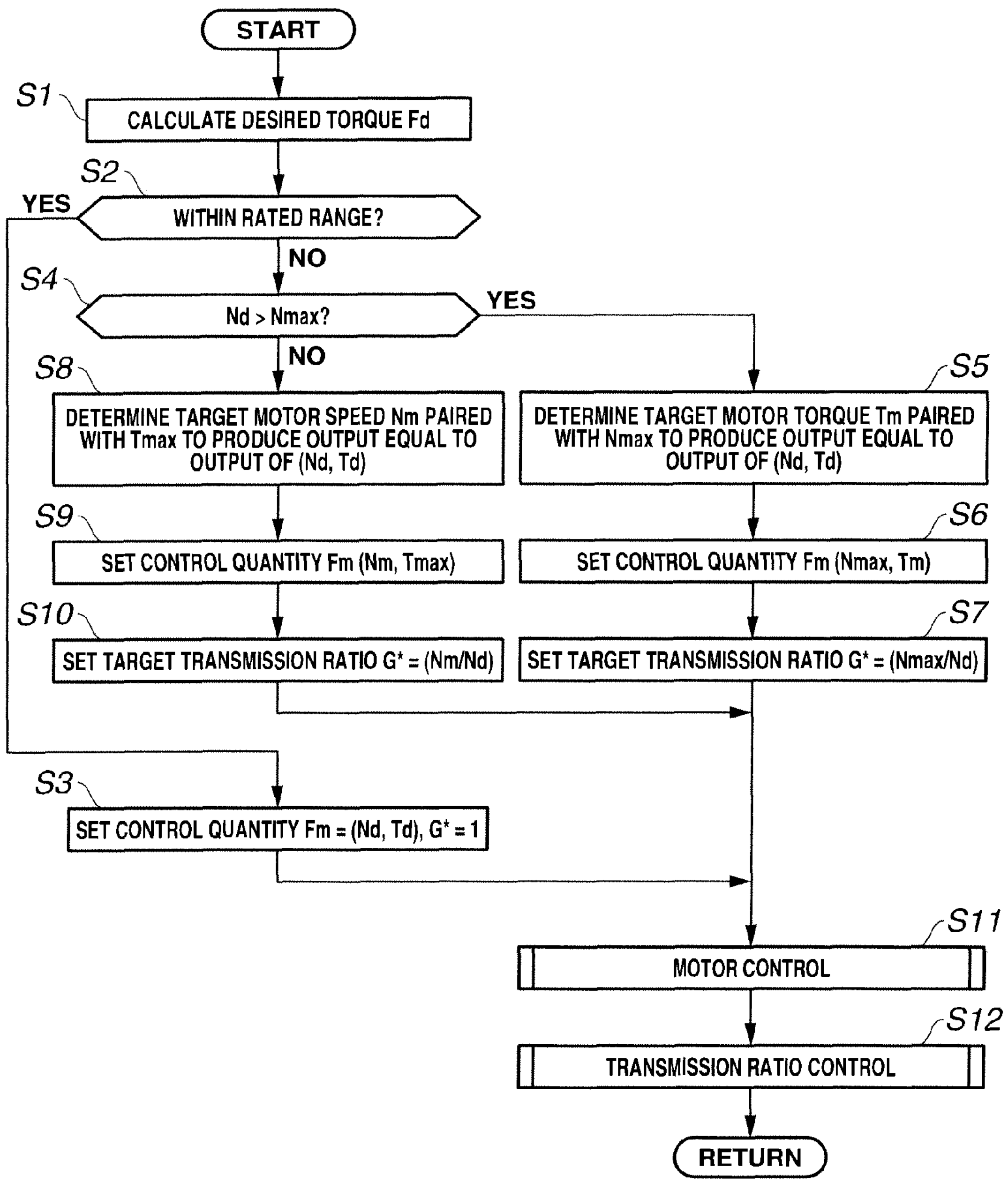
FIG. 3 is a flowchart showing a driving force control process of the practical example according to the first embodiment.

A driving force control is performed in controller 100 in the following manner. FIG. 3 shows, in the form of a flowchart, the driving force control in this practical example according to the first embodiment. In an initial state, the transmission ratio of KRG 4 is set equal to a predetermined initial ratio value which is equal to one in this example.

Figure 4:
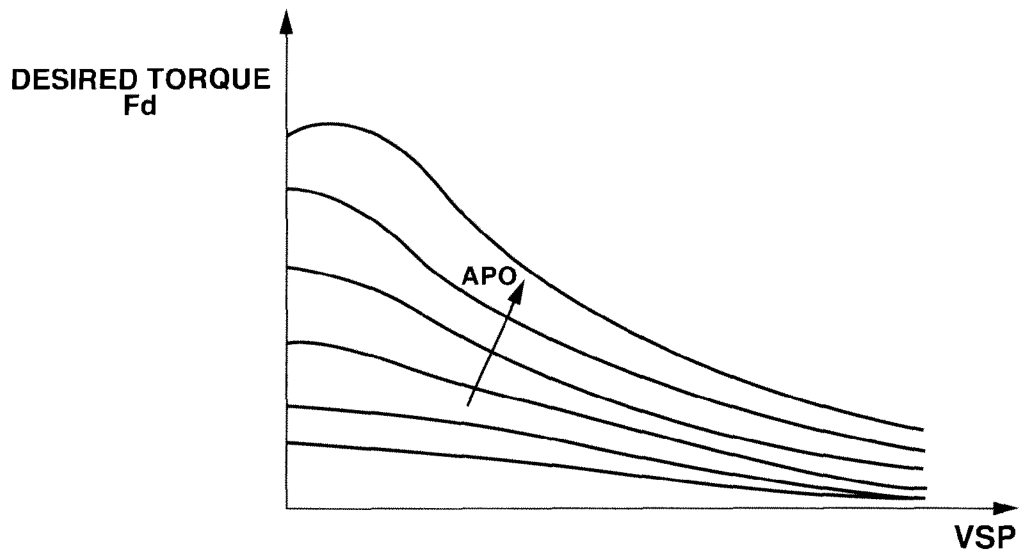
FIG. 4 is a graphic view showing a desired torque map in the practical example according to the first embodiment.

At a step S1, controller 100 calculates a desired torque Ed or desired driving torque. FIG. 4 shows a desired torque map used in this practical example. The desired torque Fd is determined in accordance with the current values of the sensed actual vehicle speed VSP (sensed by vehicle speed sensor 102) and the sensed driver's accelerator input which, in this example, is in the form of a driver's accelerator pedal opening degree APO (sensed by APO sensor 101). The map in the example of FIG. 4 consists of a plurality of characteristics each of which is set in dependence on a unique one of different values of the accelerator opening degree APO. (The setting may be continuous.) In this example, desired torque Fd is decreased monotonically with increase in the vehicle speed, and the desired torque Fd is increased with increase in the accelerator opening degree APO when APO is not greater than a predetermined value. When APO is in the range greater than the predetermined value, the desired torque Fd is first increased when VSP is increased from a minimum value (of zero) until a greatest torque value, and then the desired torque Fd is decreased monotonically from the greatest torque as VSP is further increased.

At a step S2, controller 100 calculates demand motor speed Nd and demand motor torque Td corresponding to the current value of the actual vehicle speed VSP on the assumption that the transmission ratio of KRG 4 is equal to a predetermined assumed ratio which, in this example, is equal to one, and examines whether or not the demand motor operation condition or point (Nd, Td) is within a predetermined motor operation range which is the rated range in this practical example. In this practical example, controller 100 examines whether the demand motor speed Nd is lower than or equal to a predetermined limit speed (=10000 rpm, in this example), and the demand motor torque Td is lower than or equal to a predetermined limit torque (=100 Nm, in this example). From S2, controller 100 proceeds to a step S3 when the demand motor operation point determined by the ordered set (Nd, Td) is inside the predetermined motor operation range which is the rated rage determined by the rated speed Nmax (=10000 rpm) and rated torque Tmax (=100 Nm) in this example, and to a step S4 otherwise. Step S2 corresponding to a judging means.

Thus, the controller is configured to compare the demand motor torque determined from the desired driving torque with the predetermined limit torque (Tmax) and the demand motor speed determined from the speed of the driven member or the sensed actual vehicle speed, with the predetermined limit speed (Nmax), and to proceed from S2 to S3 (for a first control mode or ratio fixing control mode) when first and second conditions are both met, and to S4 (for a second control mode or ratio varying control mode) when at least one of the first and second conditions is not met. The first condition (demand motor speed condition) is a condition which is met when the demand motor speed (Nd) is within the predetermined speed range (Nd≤Nmax), and the second condition (demand motor torque condition) is a condition which is met when the demand motor torque (Td) is within the predetermined torque range (Td≤Tmax).

At step S3, controller 100 sets (Nd, Td) as a target motor control quantity Fm, and sets a target transmission ratio G* of KRG 4 to a predetermined ratio value (or predetermined fixed ratio) which, in this example, is equal to one (G*=1). Then, at a step S11, controller 100 controls motor 2 so as to achieve the target motor control quantity (Nd, Td). At a step S12 following S11, controller 100 controls KRG 4 to perform the transmission ratio control. Step S11 corresponds to a motor controlling means. Thus, by the flow of S3, S11, S12, the controller 100 controls the motor 2 and continuously-variable transmission 4 in a first control mode or ratio fixing control mode.

At step S4, controller 100 compares the demand motor speed Nd with the predetermined limit speed or highest speed Nmax, to determine whether Nd is higher than Nmax. When Nd is higher than predetermined limit speed Nmax (the first condition or motor speed condition is not met), then controller 100 judges that the demand motor operation point (Nd, Td) is within a first outside region (or over speed region) A outside the rated range shown in FIG. 5, and proceeds from 54 to a step 55 (for a speed increase sub-mode of a second or ratio varying control mode). When Nd is not higher than Nmax (the first condition or motor speed condition is met and the second condition or motor torque condition is not met), then controller 100 judges that the demand motor torque Td is great and the demand motor operation point (Nd, Td) is within a second outside region (or over torque region) B outside the rated range shown in FIG. 5, and proceeds from S4 to a step S8 (for a speed decrease sub-mode of the second or ratio varying control mode). A remaining region outside the rated range (shaded region in FIG. 5), the first outside region A and the second outside region B is an unfeasible region such that a requirement within this unfeasible region is basically unachievable because of the output limit of inverter 200. Step S4 corresponds to the judging means.

At step S5, controller 100 determines or retrieves a value of a target motor torque Tm which is a motor torque at an intersection point between the limit speed Nmax and an equal output line (or equal output isometric line) of (Nd, Td). In this case, the target motor torque Tm is greater than the demand motor torque Td.

At a step S6, controller 100 sets (Nmax, Tm) as target motor control quantity Fm.

At a step S7, controller 100 sets target transmission ratio G* to G*=(Nmax/Nd).

At step S8, controller 100 determines or retrieves a value of a target motor speed Nm which is a motor speed at an intersection point between the limit torque Tmax and the equal output line (or isometric line) of (Nd, Td). The target motor speed Nm is higher than the demand motor speed Nd.

At a step S9, controller 100 sets (Nm, Tmax) as target motor control quantity Fm.

At a step S10, controller 100 sets target transmission ratio G* to G*=(Nm/Nd).

In the example shown in FIG. 5, each of the equal output (isometric) lines is a line drawn on the map connecting points of equal motor output or power. Each of the equal output lines is a smooth curved line along which the motor torque decreases monotonically with increase of the motor speed with a rate of decrease which decreases gradually with increase in the motor speed, and the slope of the curved line gradually becomes from a steeper gradient to a more gentle gradient with increase in the motor speed.

At step S11, controller 100 controls motor 2 in accordance with the thus-determined target motor control quantity Fm so as to achieve the target motor control quantity. At step S12, controller 100 controls KRG 4 to perform the transmission ratio control in accordance with the target transmission ratio G*. Step S11 corresponds to the motor controlling means, and step S12 corresponds to a shift controlling means or transmission controlling means.

The thus-constructed electric drive apparatus or electric drive control system is operated as follows: A motor having a very great output or power is required if a driving performance required for an ordinary vehicle (of a class from 1 t to 1.5 t, for example) is to be achieved only with a motor without the use of a transmission. The use of such a high power motor in a vehicle is problematical because of an increase in size of the motor and an increase in size of the inverter. The employment of a speed change transmission is effective for reducing the size of the motor and the size of the inverter despite the disadvantage of addition of the transmission, and thereby effective for improving the mountability or the ease of installation in vehicles. Accordingly, there are at least two options which are referred to as first and second comparative examples CE1 and CE2 hereinafter. First comparative example CE1 is an example employing a motor of a medium size and a continuously-variable transmission having a relatively narrow ratio coverage. Second comparative example CE2 employs a motor of a smaller size and a continuously-variable transmission having a wider ratio coverage.

Figure 6:
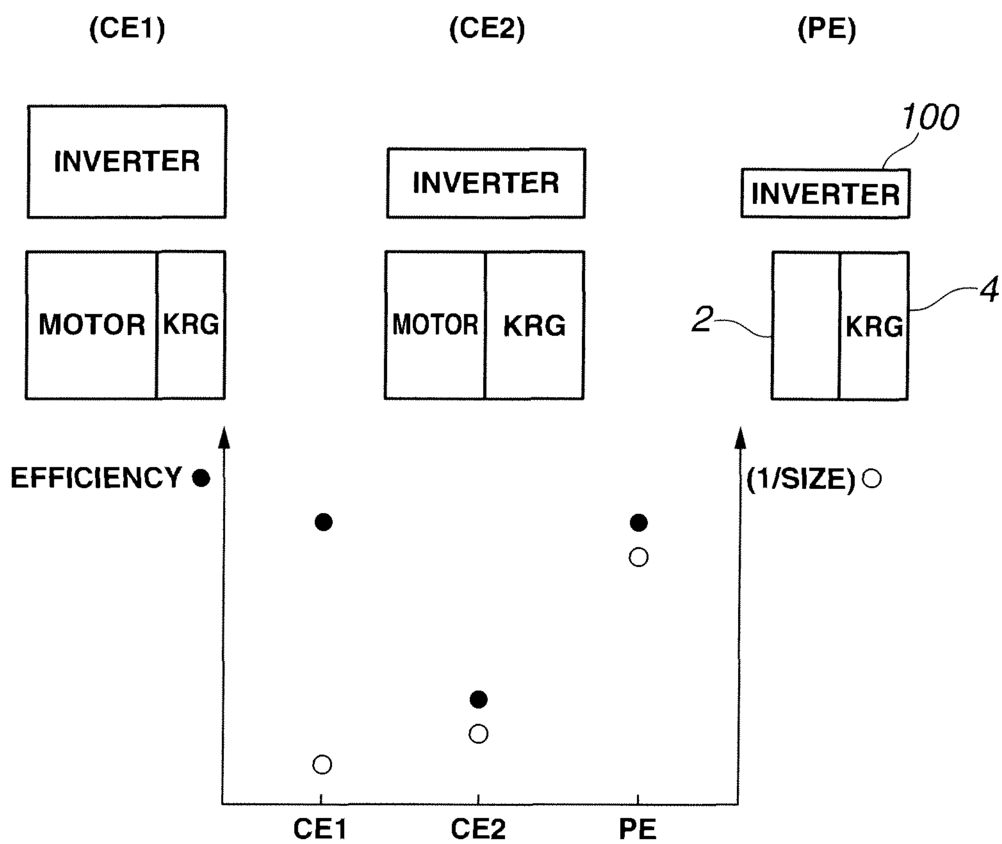
FIG. 6 is a schematic view for illustrating a relationship of the size and efficiency of the electric drive unit of the practical example (PE) according to the first embodiment in comparison with a comparative example 1 (CE1) and a comparative example 2 (CE2).

FIG. 6 is a schematic view for comparing the size and efficiency of the practical example PE according to the first embodiment, with those of first and second comparative examples CE1 and CE2. A left side vertical axis expresses the efficiency of the electric drive apparatus, and a right side vertical axis expresses the reciprocal of the size (occupied volume). The mountability (the ease of mounting) of the unit becomes better as the reciprocal of the size becomes greater. As the reciprocal of the size becomes smaller, the mountability becomes worse. In general, the efficiency of the continuously-variable transmission becomes lower as the ratio coverage is made wider. In the case of KRG 4 of the practical example PE of the first embodiment, the ratio coverage can be increased by increasing the axial dimension or by increasing the cone angle. In either case, however, the efficiency is decreased (cf. FIG. 7). Furthermore, in order to widen the output range of the motor, it is necessary to increase the size of the inverter in addition to the increase of the size of the motor.

In the case of first comparative example CE1, the ratio coverage of the continuously-variable transmission is small. Therefore, the efficiency is high, but the size becomes very large because of the need for increasing the sizes of the motor and inverter to making up for a deficit due to the insufficiency of the transmission ratio. In the case of second comparative example CE2, since the ratio coverage of the continuously-variable transmission is great, it is possible to reduce the size of the motor and the size of the inverter. However, it is necessary to increase the size of the continuously-variable transmission. Moreover, the transmission efficiency is decreased by the wider ratio coverage. Therefore, in order to compensate for this decrease of the efficiency, it is necessary to increase the sizes of the motor and inverter.

In the practical example PE according to the first embodiment, by contrast, the control system inhibits variation of the transmission ratio of the continuously variable transmission 4 in the rated range of motor 2 (to control the transmission in a most efficient ratio range), and allow variation of the transmission ratio only outside the rated range. In this example, the transmission ratio is fixed at the most efficient ratio of one inside the motor rated range, and the transmission ratio is varied to the speed increase side or the speed decrease side outside the rated range. Therefore, the electric drive apparatus or system of the practical example PE can prevent unwanted decrease of the transmission efficiency by narrowing the ratio coverage of the continuously-variable transmission. Moreover, the transmission efficiency is not decreased too much and hence there is no need for compensating for the decrease of the transmission efficiency with the motor. Accordingly, the electric drive apparatus of the practical example PE can prevent or restrain an unwanted increase of the sizes of the motor and inverter.

The electric drive apparatus or system according to the first embodiment (or according to any of the following embodiments) can provide the following advantages.

(1) An electric drive apparatus (according to the first embodiment (or any of second, third and fourth embodiments) comprises: an electric motor (2) adapted to drive a driven member (6 or 5); an inverter (200) to supply an electric power from a power source to the motor; a continuously-variable transmission (such as KRG) (4) connected with the motor, to transmit rotation from the motor to the driven member; and a control section (100) to control the speed and torque of the motor by controlling the inverter and to control a transmission ratio (or gear ratio) of the continuously-variable transmission. The control section (100) may be configured to include a motor controlling means (or subsection) (S11) to control the inverter and thereby control the motor in a predetermined motor operation range (such as the rated range)(within a predetermined torque range and within a predetermined speed range), a transmission controlling means (or subsection) (S12) to control the transmission ratio (or gear ratio) of the continuously-variable transmission (KRG) 4, and a judging means (or subsection)(S2) to examine a demand motor torque (Td) determined on the assumption that the (actual) transmission ratio of the continuously-variable transmission is equal to a predetermined assumed ratio (=1) and a demand motor speed (Nd) determined from a (sensed actual) speed of the driven member (such as the sensed vehicle speed), to determine whether the demand motor speed is within a predetermined speed range, and the demand motor torque is within a predetermined torque range. When the judgment of the judging means is that the demand motor speed is within the predetermined speed range, and the demand motor torque is within the predetermined torque range, then the transmission controlling means controls the (actual) transmission ratio to a predetermined fixed ratio (=1) so as to prevent the transmission ratio from being increased beyond the fixed ratio and from being decreased below the fixed ratio (or to fix the transmission ratio at the predetermined fixed ratio (=1) or contain the transmission ratio invariably within a limited narrow range around the fixed ratio), and at the same time the motor controlling means controls the motor 2 to achieve the demand motor torque (Td). When the judgment of the judging means is negative in the case of the outside of the predetermined range, then the transmission controlling means varies, or allows variation (increased and decrease) of, the transmission ratio of the continuously-variable transmission (KRG) 4, and at the same time the motor controlling means controls the motor to achieve the desired torque Fd. Therefore, this electric drive apparatus enables the size reduction or downsizing.

When the demand motor speed Nd obtained by conversion from the rotational speed of the driven member with the assumed ratio value (=1) is outside the predetermined operation range (the rated range), the motor controlling means (by the control flow of S2, S4, S5, S6 and S11) sets the motor speed to the maximum speed (Nmax), and controls the (actual) torque of the motor to the target motor toque Tm corresponding to the maximum speed (Nmax) on an equal-output line to which the demand motor torque Td (or the desired torque Fd) belongs, and the transmission controlling means (S7, S12) achieves the rotational speed of the driven member by increasing the speed higher than the maximum speed Nmax. In other words, the (actual) transmission ratio is controlled to the target transmission ratio G*=(Nmax/Nd). Thus, the electric drive apparatus can minimize the variation of the transmission ratio, and restrain an unwanted decrease of the driving efficiency.

When the demand motor torque Td (or the desired driving torque Fd) is outside the predetermined operation range (the rated range), the motor controlling means (by the control flow of S2, S4, S8, S9 and S11) sets the motor torque to the maximum torque (Tmax), and controls the (actual) speed of the motor to the target motor speed Nm corresponding to the maximum torque (Tmax) on an equal-output line to which the demand motor torque Td (or the desired driving torque Fd) belongs, and the transmission controlling means (S10, S12) achieves the rotational speed of the driven member by decreasing the speed lower than the speed Nm corresponding to the maximum torque Tmax. In other words, the (actual) transmission ratio is controlled to the target ratio G*=(Nm/Nd). Thus, the electric drive apparatus can minimize the variation of the transmission ratio, and restrain an unwanted decrease of the driving efficiency.

Second Embodiment

Electric drive apparatus according to a second embodiment is basically the same as the electric drive apparatus according to the first embodiment, shown in FIG. 1, and different in the following s points. In the practical example of the first embodiment, the size reduction is achieved by decreasing the axial dimension of the continuously-variable transmission (KRG) 4 so as to decrease the ratio coverage and improve the efficiency of the continuously-variable transmission. In other words, the electric drive apparatus is so arranged as not to use the region in which the efficiency of the continuously-variable transmission becomes low. In the second embodiment, by contrast, the efficiency is improved by decreasing the cone angle instead of decreasing the axial dimension, and thereby the size reduction of the motor and inverter is achieved.

Since the load involved in speed increase/decrease caused by a shift operation of KRG 4 is small, it is possible to restrain a loading force. In this case, it is possible to increase the inclination of a cam surface of a loading cam, and thereby further to improve the transmission efficiency.

Figure 7:
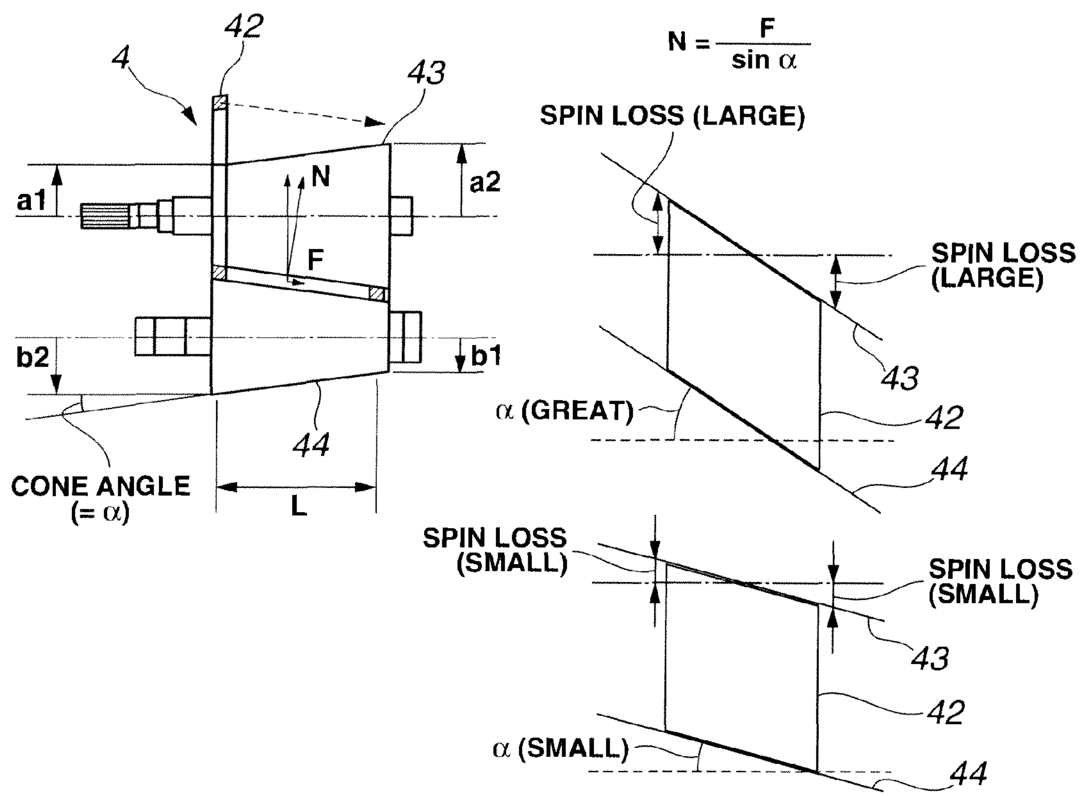
FIG. 7 is a schematic view for illustrating dimensions of a continuously-variable transmission (KRG) in a practical example according to a second embodiment of the present invention.

FIG. 7 is a schematic view for illustrating a relationship among dimensions of KRG in the practical example of the second embodiment. As shown in FIG. 7, the shape of input cone 43 is defined by smallest radius al, greatest radius a2, and axial length L, and the shape of output cone 44 is defined by smallest radius b1, greatest radius b2, and axial length L. These dimensions are related with one another, as expressed by the following equation (where α (alpha) is the cone angle).

$$(a2-a1)/L=(b2-b1)/L=\tan\alpha.$$

A relationship between a loading force F and a normal force N is expressed by N=F/sin α. The loading force F is a force pushing the input and output cones axially toward each other so that both cones come closer to each other. The frictional force is given by N×μ (that is the product between N and the friction coefficient mu). In order to maintain a required ratio coverage with a short axial dimension L, it is necessary to increase the cone angle α. However, the increase of the cone angle a causes a spin loss due to an increase of the rotation speed difference in the shift ring 42, and hence results in a decrease of the transmission efficiency. Therefore, the practical example of the second embodiment is arranged to restrain a decrease of the transmission efficiency by decreasing the cone angle α rather than decreasing the axial length.

Third Embodiment

Figure 8:
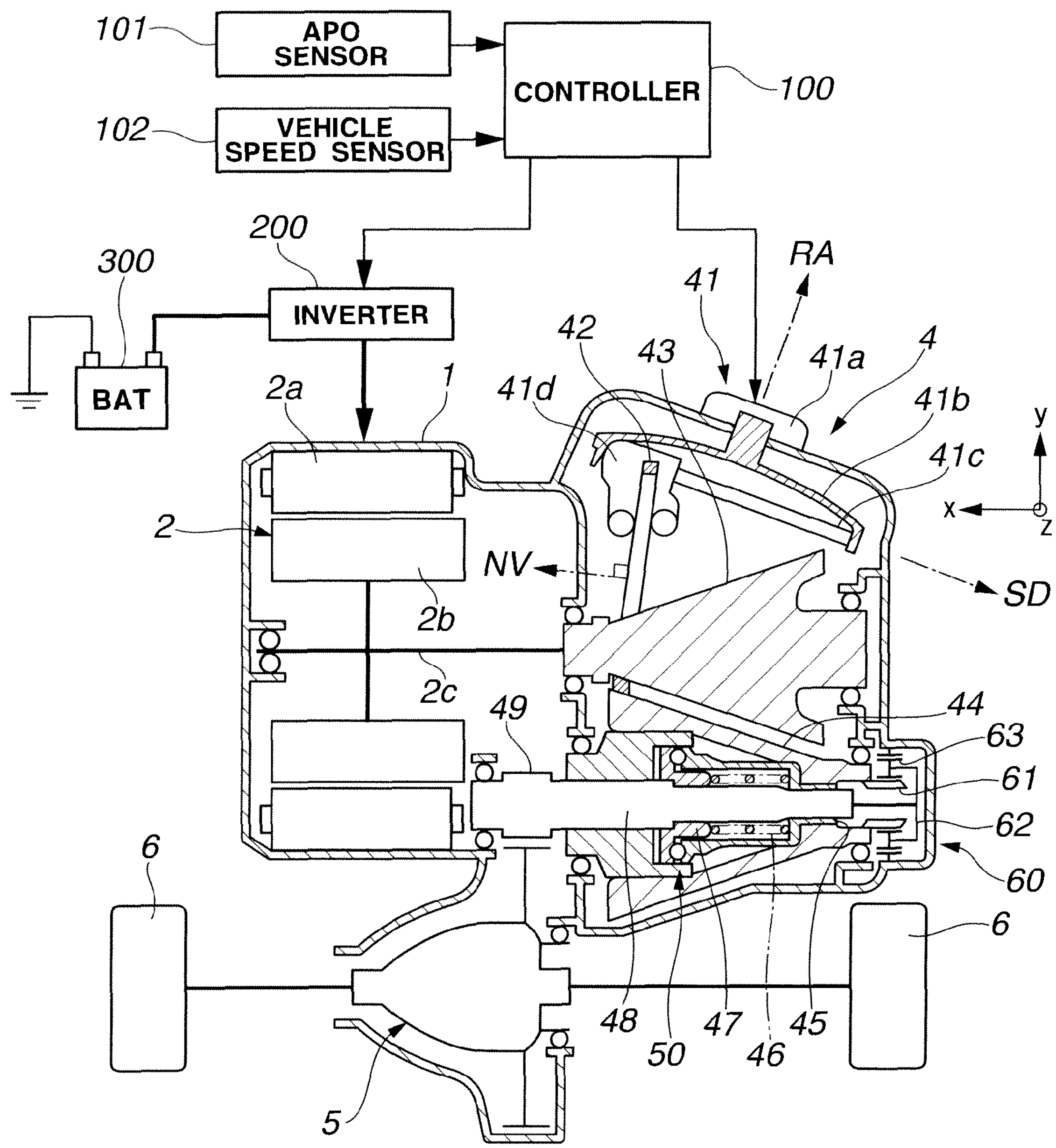
FIG. 8 is a schematic view showing an electric vehicle equipped with an electric drive apparatus of a practical example according to a third embodiment of the present invention.

FIG. 8 shows an electric vehicle equipped with an electric drive apparatus or system in a practical example according to a third embodiment of the present invention. The drive apparatus of FIG. 8 is basically the same as that of the first embodiment, and different in the following points. The drive unit of FIG. 8 includes a speed reducer 60 provided between the output cone 44 and output shaft 48 in addition to the components of the drive unit shown in FIG. 1. A sun gear 61 is formed at an end of the output cone 44, and a ring gear 63 is fixed to the housing 1. A pinion carrier 62 supporting pinions meshing with the sun gear 61 and ring gear 63 is connected with the output shaft 48. The thus-constructed planetary gear set further reduces the rotational speed reduced by the input cone 43 and output cone 44, and transmits the rotation of the further reduced speed to output shaft 48. Therefore, even if there is a limitation on the final reduction ratio, the drive unit can achieve a greater reduction ratio. Furthermore, the drive unit provide a greater reduction ratio with a small size. The speed reducer 60 (61, 62, 63) is arranged coaxially with output cone 44. This coaxial arrangement is advantageous in the compactness and the ease in mounting the drive unit in a vehicle.

Fourth Embodiment

Figure 9:
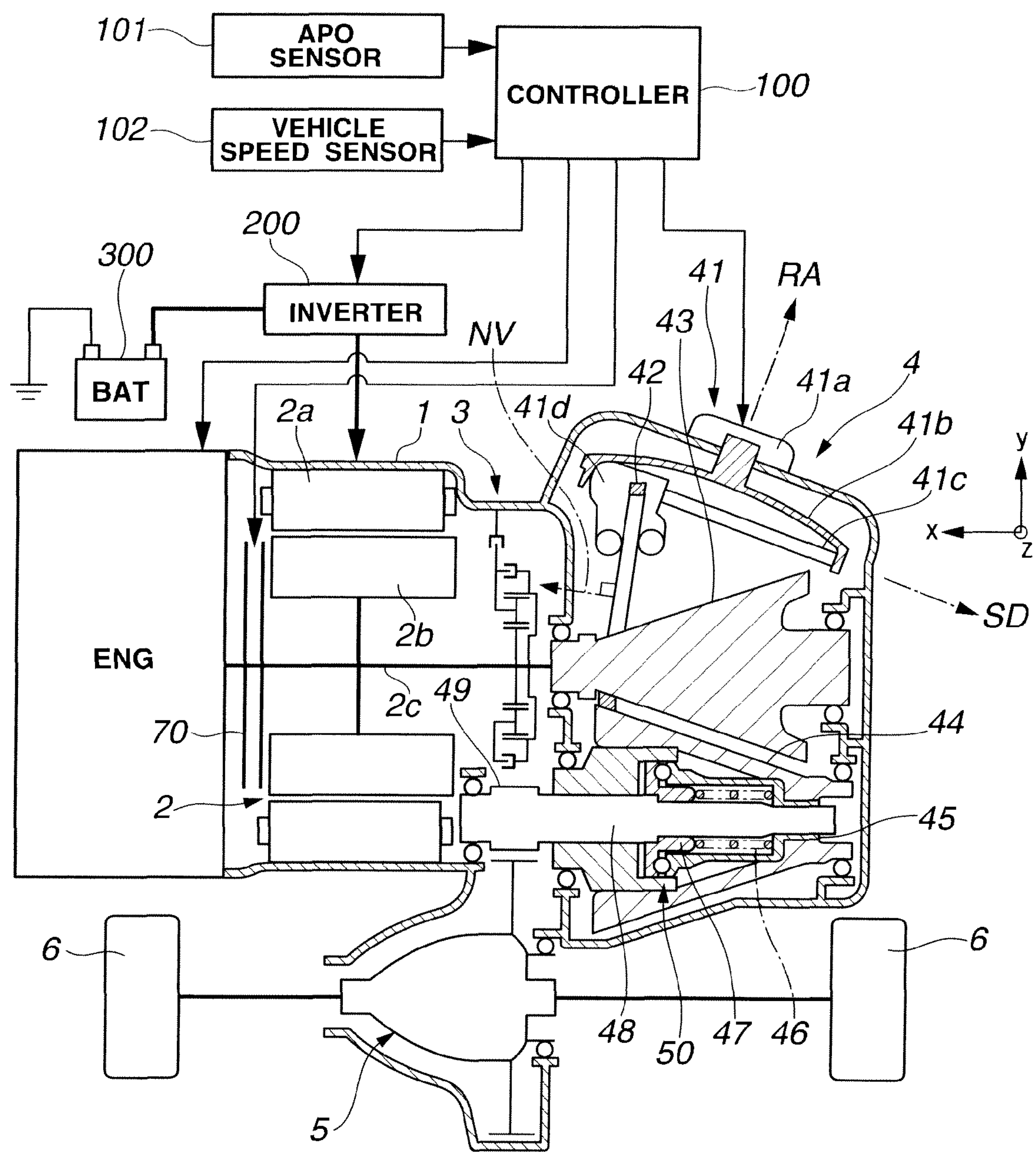
FIG. 9 is a schematic view showing a hybrid vehicle equipped with an electric drive apparatus of a practical example according to a fourth embodiment of the present invention.

FIG. 9 shows a hybrid vehicle equipped with an electric drive apparatus or system in a practical example according to a fourth embodiment of the present invention. The electric drive apparatus of the preceding embodiments are adapted for the electric vehicle powered only with the electric motor. In the fourth embodiment, by contrast, the electric drive apparatus is for the hybrid vehicle including an engine ENG. In the practical example shown in FIG. 9, the engine ENG is connected with the electric motor 2 through a clutch 70 for making and breaking the connection between engine ENG and motor 2. Controller 100 is configured to control the operating condition of engine ENG, and the engaged/disengaged condition of clutch 70 in accordance with vehicle operating condition, and thereby to drive the vehicle with an optimum efficiency. Since engine ENG is rotatable only in one rotational direction, there is provided a forward-reverse changeover mechanism 3 between motor 2 and continuously-variable transmission (KRG) 4. This forward-reverse changeover mechanism is a known mechanism including a planetary gear mechanism, a forward clutch and a reverse clutch, so that further explanation is omitted. In the thus-constructed hybrid vehicle, the drive system can reduce the variation width of the transmission ratio of the continuously-variable transmission (KRG) 4 by the control as in the first embodiment, and thereby restrain an unwanted decrease of the driving efficiency in the case of an EV mode in which the vehicle is driven only by the driving force of electric motor 2.

The present invention is not limited to the illustrated embodiments. Various modifications and variations are possible within the purview of the present invention. For example, the continuously-variable transmission 4 is not limited to the cone ring type continuously-variable transmission. The continuously-variable transmission which can be employed in the electric drive apparatus according to the present invention may be a belt type CVT or a toroidal type CVT. The cone ring CVT (KRG) is advantageous in const because the number of required parts is smaller, and oil pump is not required.

The present invention is applicable not only to vehicles such as electric vehicle and hybrid vehicle, but also to various other applications using a motor as a driving power source.

In the practical example of the first embodiment, the predetermined fixed ratio is set equal to "one" at which the efficiency is highest. However, the fixed ratio at which the transmission is fixed within the predetermined motor operation range is not limit to "one", and the fixed ratio may be set equal to a transmission ratio value advantageous for improving or optimizing the efficiency when, for example, the load is applied to the mechanism in a balanced manner at a predetermined ratio in consideration of the ratio between the radii of the input cone and output cone. In this case, consideration is to be given to the control in the A region and the B region so that there can be provided, on both sides of the predetermined fixed ratio, shift ranges of predetermined not-too-narrow widths.

Since the predetermined fixed ratio is equal to "one" in the practical example of the first embodiment, the desired torque required by the vehicle is compared directly with the torque of the motor. When the fixed ratio is not equal to "one", the examination as to whether the operation point is within the predetermined operation range or the rated range is to be performed in dependence on the transmission ratio of the continuously-variable transmission.

In the practical example of the first embodiment, the first control mode for controlling the transmission ratio invariably to the fixed ratio is performed in the rated range determined by the rated speed and rated torque because the efficiency of motor 2 is high in this rated range. However, it is optional to widen the predetermined motor operation range in which the first control mode is performed, beyond the rated range to in the direction beyond the rated speed and/or in the direction beyond the rated torque when there is a high efficiency region outside the rated range. Conversely, if, inside the rated range, there is a lower efficiency region in which the efficiency of the motor becomes lower as compared to a decrease of the efficiency due to variation of the transmission ratio, it is optional to narrow the predetermined motor operation range to exclude such a lower efficiency region.

Since the predetermined assumed ratio is equal to "one" in the practical example of the first embodiment, the controller can examine whether the desired driving torque Fd is within the predetermined torque range or the rated torque range. When, however, the assumed ratio is not equal to "one", the controller converts the desired driving torque Fd to the demand motor torque Td (or second desired torque), and examines the thus-determined demand motor torque Td to determine whether or not the demand motor torque Td is within the predetermined torque range or the rated torque range.

Fifth Embodiment

In a fifth embodiment of the present invention, the predetermined fixed ratio is greater than one, and the transmission ratio (input speed/output speed) of KRG 4 is fixed at the predetermined fixed ratio greater than one within the predetermined motor operation range. In an example shown in FIG. 10, the fixed ratio is equal to 1.3, and the predetermined motor operation range is the rated range of the motor. The control system holds the transmission ratio of KRG 4 constantly at the fixed ratio greater than one within the rated range, and shifts (decrease or increase) the transmission ratio to the High side (to a smaller ratio value) or the Low side (to a greater ratio value) when the demand is outside the rated range.

In the practical example of the first embodiment, at step S2, the controller 100 calculates the demand motor speed Nd and demand motor torque Td corresponding to the actual vehicle speed VSP on the assumption that the transmission ratio of KRG 4 is equal to the predetermined assumed ratio which is equal to one, and examines whether or not the demand motor operation point (Nd, Td) is within the predetermined motor operation range which is the rated range. In the fifth embodiment, by contrast, controller 100 calculates the demand motor speed Nd and demand motor torque Td on the assumption that the transmission ratio of KRG 4 is equal to the predetermined assumed ratio (1.3) which is greater than one. Therefore, with respect to the rated range of motor 2 (a rectangular region shown by a solid line in FIG. 10), the output range of KRG 4 (a rectangular region shown by a one-dot chain line in FIG. 10) is deviated in a direction decreasing the speed and increasing the torque.

Figure 10:
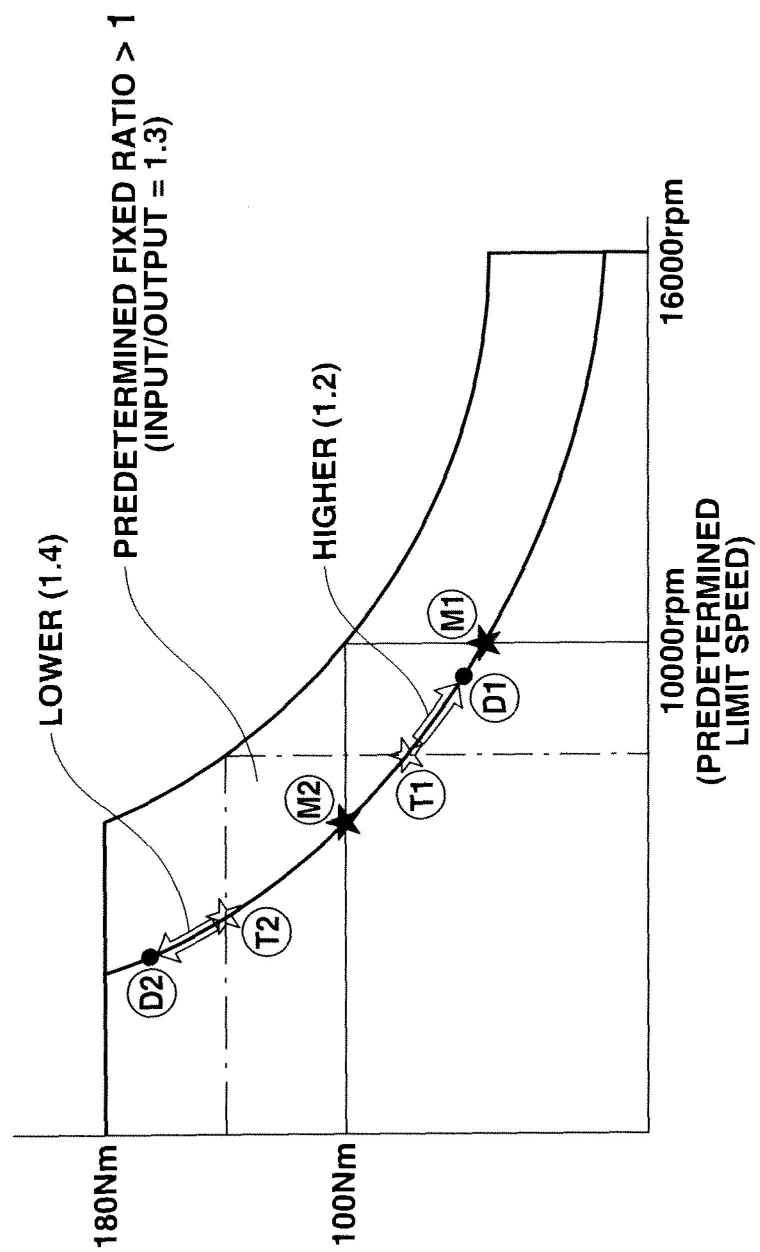
FIG. 10 is a view showing a relationship of motor speed and motor torque and a relationship of transmission output shaft speed and transmission output shaft torque in a practical example according to a fifth embodiment in which the transmission ratio is fixed at a ratio greater than one within a predetermined motor operation range (rated range of the motor).

When the speed of motor 2 is located at a point M1 of the highest speed of the rated range of motor 2, the speed of the output shaft of KRG 4 is located at a point T1 on a lower speed side of point M1, as shown in FIG. 10. Therefore, if the desired speed of the driven member is at a point Dl lower in speed than M1, but higher in speed than T1, then the control system can control KRG 4 to shift (decrease) the transmission ratio (input speed/output speed) of KRG 4 to the High side (to a ratio value of 1.2 smaller than 1.3, for example), and thereby increase the speed of the driven member to the desired speed without varying the speed of motor 2 outside the rated range.

When the output torque of motor 2 is located at a point M2 of the greatest torque of the rated range of motor 2, the torque of the output shaft of KRG 4 is located at a point T2 on a greater toque side of point M2, as shown in FIG. 10. Therefore, if the desired torque of the driven member is at a point greater in torque than M2, but smaller in torque than T2, then the control system holds the transmission ratio of KRG 4 constantly at 1.3, and controls the motor 2 to achieve the desired torque. If, on the other hand, the desired torque of the driven member is at a point D2 greater in torque than T2, then the control system can control KRG 4 to shift (increase) the transmission ratio of KRG 4 to the Low side (to a ratio value of 1.4 greater than 1.3, for example), and thereby increase the torque of the driven member to the desired toque without varying the output torque of motor 2 outside the rated range.

Sixth Embodiment

In a sixth embodiment, the predetermined fixed ratio is smaller than one, and the transmission ratio (input speed/output speed) of KRG 4 is fixed at the predetermined fixed ratio smaller than one within the predetermined motor operation range. In an example shown in FIG. 11, the fixed ratio is equal to 0.7, and the predetermined motor operation range is the rated range of the motor. The control system holds the transmission ratio of KRG 4 constantly at the fixed ratio smaller than one within the rated range, and shifts (decrease or increase) the transmission ratio to the High side or the Low side when the demand is outside the rated range.

In the sixth embodiment, controller 100 calculates the demand motor speed Nd and demand motor torque Td on the assumption that the transmission ratio of KRG 4 is equal to the predetermined assumed ratio (0.7) which is smaller than one. Therefore, with respect to the rated range of motor 2 (a rectangular region shown by a solid line in FIG. 11), the output range of KRG 4 (a rectangular region shown by a one-dot chain line in FIG. 11) is deviated in a direction increasing the speed and decreasing the torque.

Figure 11:
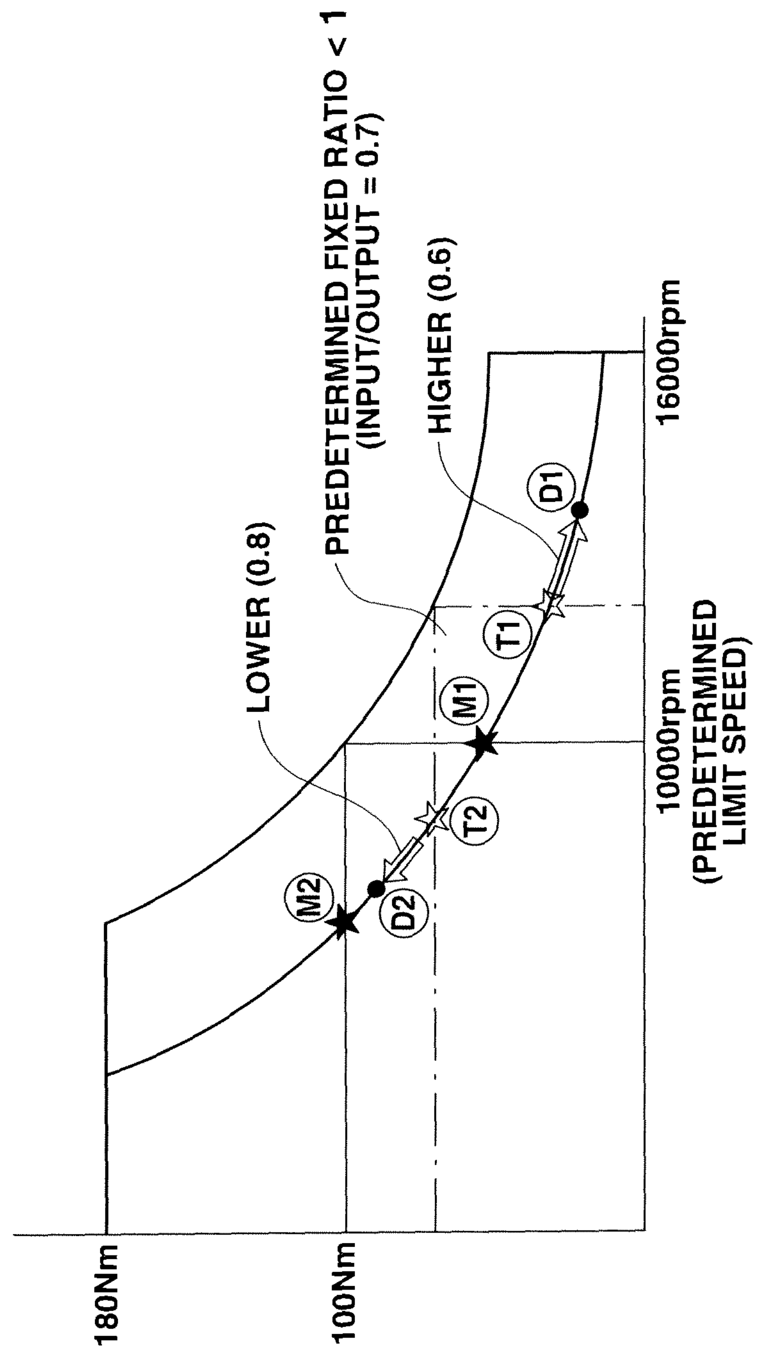
FIG. 11 is a view showing a relationship of motor speed and motor torque and a relationship of transmission output shaft speed and transmission output shaft torque in a practical example according to a sixth embodiment in which the transmission ratio is fixed at a ratio smaller than one within a predetermined motor operation range (rated range of the motor).

When the output torque of motor 2 is located at a point M2 of the greatest torque of the rated range of motor 2, the torque of the output shaft of KRG 4 is located at a point T2 smaller in torque than M2, as shown in FIG. 11. Therefore, if the desired torque of the driven member is at a point D2 lower in torque than M2, but greater in torque than T2, then the control system can control KRG 4 to shift (increase) the transmission ratio of KRG 4 to the Low side (to a ratio value of 0.8 greater than 0.7, for example), and thereby increase the torque of the driven member to the desired torque without varying the output torque of motor 2 outside the rated range.

When the speed of motor 2 is located at a point M1 of the highest speed of the rated range of motor 2, the speed of the output shaft of KRG 4 is located at a point T1 higher in speed than M1, as shown in FIG. 11. Therefore, if the desired speed of the driven member is at a point higher in speed than M1, but lower in speed than T1, then the control system holds the transmission ratio of KRG 4 constantly at 0.7, and controls the motor 2 to achieve the desired speed. If, on the other hand, the desired speed of the driven member is at a point D1 higher in speed than T1, then the control system can control KRG 4 to shift (decrease) the transmission ratio of KRG 4 to the High side (to a ratio value of 0.6 smaller than 0.7, for example), and thereby increase the speed of the driven member to the desired speed without varying the speed of motor 2 outside the rated range.

This application is based on a prior Japanese Patent Application No. 2009-227099 filed in Japan on Sep. 30, 2009. The entire contents of this Japanese Patent Application are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An electric drive apparatus comprising:

an electric motor adapted to drive a driven member;

an inverter to supply an electric power from a power source to the motor;

a continuously-variable transmission connected with the motor to transmit rotation from the motor to the driven member; and a controller to control the motor by controlling the inverter and to control a transmission ratio of the continuously-variable transmission so as to achieve a desired driving torque, the controller being configured:

to determine whether a demand motor operation point determined by a demand motor speed and a demand motor torque is within a predetermined motor operation range in which the demand motor speed is within a predetermined speed range, and the demand motor torque is within a predetermined torque range, the demand motor torque being a torque determined from the desired driving torque and the demand motor speed being a speed determined from a speed of the driven member based on the transmission ratio of the continuously-variable transmission being equal to a predetermined assumed ratio, to control the motor and the continuously-variable transmission in a first control mode to control the transmission ratio of the continuously-variable transmission to a predetermined fixed ratio so as to hold the transmission ratio at the fixed ratio, and to control the motor to achieve the demand motor torque when the demand motor operation point is within the predetermined operation range; and to control the motor and the continuously-variable transmission in a second control mode to vary the transmission ratio of the continuously-variable transmission and to control the motor to achieve the desired driving torque when the demand motor operation point is not within the predetermined operation range.

2. The electric drive apparatus as claimed in claim 1, wherein the controller is configured:

to control the motor and the continuously-variable transmission in a speed increase mode to control the motor speed of the motor to a predetermined limit speed defining a limit of the predetermined speed range, to control the motor to a target motor torque which is a torque corresponding to the predetermined limit speed on an equal-output line to which the demand motor torque belongs, and to control the continuously-variable transmission to a speed-increasing target transmission ratio to increase a transmission output speed of the continuously-variable transmission beyond the predetermined limit speed when the demand motor speed is not within the predetermined speed range.

3. The electric drive apparatus as claimed in claim 1, wherein the controller is configured:

to control the motor and the continuously-variable transmission in a speed decrease mode to control the motor torque of the motor to a predetermined limit torque defining the predetermined torque range, to control the motor to a target motor speed which is a speed corresponding to the predetermined limit torque on an equal-output line to which the demand motor torque belongs, and to control the continuously-variable transmission to a speed-decreasing target transmission ratio to decrease the transmission output speed of the continuously-variable transmission lower than the motor speed of the motor when the demand motor torque is not within the predetermined torque range.

4. The electric drive apparatus as claimed in claim 1, wherein each of the predeteiinined assumed ratio and the predetermined fixed ratio is equal to a value of the transmission ratio at which an efficiency of the continuously-variable transmission is maximized.

5. The electric drive apparatus as claimed in claim 1, wherein the controller is configured:

to control the motor and the continuously-variable transmission in a speed increase mode included in the second control mode, to control the speed of the motor to a predetermined limit speed defining a limit of the predetermined speed range, to control the torque of the motor to a speed-increase-mode target motor torque which is determined such that a motor output power produced by the speed-increase-mode target motor torque and the predetermined limit speed is equal to a motor output power produced by the demand motor torque and the demand motor speed, and to control the transmission ratio of the continuously-variable transmission to a speed-increasing target transmission ratio to make a transmission output speed of the continuously-variable transmission higher than a transmission input speed when the demand motor speed is higher than the predetermined limit speed and the demand motor torque is within the predetermined torque range.

6. The electric drive apparatus as claimed in claim 1, wherein the controller is configured:

to control the motor and the continuously-variable transmission in a speed decrease mode included in the second control mode to control the torque of the motor to a predetermined limit torque defining the predetermined torque range, to control the speed of the motor to a speed-decrease-mode target motor speed which is determined such that a motor output power produced by the predetermined limit torque and the speed decrease-mode target motor speed is equal to a motor output power produced by the demand motor torque and the demand motor speed, and to control the transmission ratio of the continuously-variable transmission to a speed-decreasing target transmission ratio to make the transmission output speed of the continuously-variable transmission lower than the transmission input speed when the demand motor torque is greater than the predetermined limit torque, and the demand motor speed is within the predetermined speed range.

7. The electric drive apparatus as claimed in claim 1, wherein a value of the predetermined assumed ratio is equal to a value of the predetermined fixed ratio.

8. The electric drive apparatus as claimed in claim 1, wherein the controller is configured:

to control the motor and the continuously-variable transmission in the first control mode of fixing the transmission ratio of the continuously-variable transmission at the predetermined fixed ratio which is equal to a value of the assumed ratio and to control the motor to achieve the demand motor torque when first and second conditions are met, the first condition being a condition which is met when the demand motor speed is within the predetermined speed range, and the second condition being a condition which is met when the demand motor torque is within the predetermined torque range, wherein the controller is configured to control the motor and the continuously-variable transmission in the second control mode of varying the transmission ratio of the continuously-variable transmission and control the motor to achieve the desired driving torque when at least one of the first and second conditions is not met.

9. The electric drive apparatus as claimed in claim 1, wherein the electric drive apparatus further comprises a sensor to collect input information, and the controller is configured to determine the desired driving torque in accordance with the input information collected by the sensor, wherein the input information includes an actual driven speed of the driven member, and an operator's demand.

10. The electric drive apparatus as claimed in claim 1, wherein the electric drive apparatus is adapted to drive a wheel of a vehicle which is one of an electric vehicle and a hybrid vehicle.

11. The electric drive apparatus as claimed in claim 10, wherein the electric drive apparatus further comprises a vehicle speed sensor for sensing a vehicle speed of the vehicle and an accelerator input sensor for sensing a driver's accelerator input of a driver of the vehicle, and the controller is configured to determine the desired driving torque in accordance with the vehicle speed and the driver's accelerator input.

12. The electric drive apparatus as claimed in claim 1, wherein the predetermined motor operation range is a rated range of the motor, the predetermined limit speed is a rated speed of the motor, and the predetermined limit torque is a rated torque of the motor;

wherein the continuously-variable transmission is one of a cone ring continuously-variable transmission, a belt continuously variable transmission and a toroidal continuously-variable transmission; and/or wherein the predetermined fixed ratio is equal to one.

13. The electric drive apparatus as claimed in claim 1, wherein the controller is configured:

to calculate the demand motor torque from the desired driving torque and the demand motor speed from a sensed actual speed of the driven member based on the transmission ratio of the continuously-variable transmission being set equal to the predetermined assumed ratio, to determine whether a demand motor operation point determined by an ordered pair of the demand motor speed and the demand motor torque is within the predetermined motor operation range in which the demand motor speed is within the predeteimined speed range lower than or equal to a predetermined limit speed, and the demand motor torque is within the predetermined torque range smaller than or equal to a predetermined limit torque, to control the motor and the continuously-variable transmission in the first control mode to prevent increase and decrease of the transmission ratio away from the fixed ratio and to control the motor to achieve the demand motor torque when the demand motor speed is lower than or equal to the predetermined limit speed and the demand motor torque is smaller than or equal to the predetermined limit torque; and to control the motor and the continuously-variable transmission in the second control mode to vary the transmission ratio of the continuously-variable transmission and to control the motor to achieve the desired driving torque when the demand motor speed is higher the predetermined limit speed and/or the demand motor torque is greater than the predetermined limit torque.

14. The electric drive apparatus as claimed in claim 1, wherein the predetermined assumed ratio is a predetermined value of the transmission ratio which is a quotient obtained by dividing a rotational speed of an input shaft of the continuously-variable transmission by a rotational speed of an output shaft of the continuously-variable transmission; and the controller is configured:

to control the motor and the continuously-variable transmission in a shift mode to control the motor speed of the motor to a predetermined limit speed defining the predetermined speed range, to control the motor to a target motor torque which is a torque corresponding to the predetermined limit speed on an equal-output line to which the demand motor torque belongs, and to vary the transmission ratio of the continuously-variable transmission to a value smaller than the predetermined assumed ratio when the demand motor speed is not within the predetermined speed range.

15. The electric drive apparatus as claimed in claim 1, wherein the predetermined assumed ratio is a predetermined value of the transmission ratio which is a quotient obtained by dividing a rotational speed of an input shaft of the continuously-variable transmission by a rotational speed of an output shaft of the continuously-variable transmission; and the controller is configured:

to control the motor and the continuously-variable transmission in a shift mode to control the motor torque of the motor to a predeteimined limit torque defining the predetermined torque range, to control the motor to a target motor speed which is a speed corresponding to the predetermined limit toque on an equal-output line to which the demand motor torque belongs, and to vary the transmission ratio of the continuously-variable transmission to a value greater than the predetermined assumed ratio when the demand motor torque is not within the predetermined torque range.

16. An electric drive control process of controlling an electric motor and a continuously-variable transmission connected with the motor, to transmit rotation from the motor to a driven member to be driven by the motor for achieving a desired driving torque, the control process comprising:

determining whether a demand motor operation point determined by a demand motor speed and a demand motor torque is within a predetermined operation range in which the demand motor speed is within a predetermined speed range, and the demand motor torque is within a predetermined torque range, the demand motor torque being a torque determined from the desired driving torque and the demand motor speed being a speed determined from a speed of the driven member based on a transmission ratio of the continuously-variable transmission being equal to a predetermined assumed ratio;

controlling the motor and the continuously-variable transmission in a first control mode to control the transmission ratio of the continuously-variable transmission to a predetermined fixed ratio and control the motor so as to achieve the demand motor torque when the demand motor operation point is within the predetermined operation range; and controlling the motor and the continuously-variable transmission in a second control mode to vary the transmission ratio of the continuously-variable transmission and control the motor so as to achieve the desired driving torque when the demand motor operation point is not within the predetermined operation range.

17. The electric drive apparatus as claimed in claim 1, wherein the controller is configured to:

compare the demand motor speed of the motor with a predetermined limit speed;

compare the demand motor torque of the motor with a predetermined limit torque;

control the motor and the continuously-variable transmission in the first control mode when the demand motor speed of the motor is lower than or equal to the predetermined limit speed and the demand motor torque of the motor is lower than or equal to the predetermined limit torque; and control the motor and the continuously-variable transmission in the second control mode when the demand motor speed of the motor is higher than the predetermined limit speed or the demand motor torque of the motor is higher than the predetermined limit torque.

* * * * *